United States Patent [19]

Shimmin et al.

[11] Patent Number: 4,518,641

[45] Date of Patent: May 21, 1985

[54] NON-SLIP SURFACE COATINGS

[75] Inventors: Bryan F. Shimmin, Feniscowles; James B. Pollard, Worsley, both of England

[73] Assignee: Reed International P.L.C., London, England

[21] Appl. No.: 466,775

[22] Filed: Feb. 16, 1983

[51] Int. Cl.[3] ............................................. B32B 5/16

[52] U.S. Cl. .................................. 428/150; 427/136; 427/427; 428/144; 428/323; 428/331

[58] Field of Search ............... 428/323, 144, 149, 150, 428/323, 331; 427/136, 137, 427

[56] References Cited

U.S. PATENT DOCUMENTS

| | | | |
|---|---|---|---|
| 3,267,187 | 8/1966 | Slosberg et al. | 428/143 X |
| 3,930,088 | 12/1975 | Constantin et al. | 428/323 X |
| 4,020,211 | 4/1977 | Eigenmann | 428/323 |
| 4,105,816 | 8/1978 | Hori | 428/195 X |
| 4,196,243 | 4/1980 | Sachs et al. | 428/147 |
| 4,243,696 | 1/1981 | Toth | 427/201 X |
| 4,267,221 | 5/1981 | Ishikawa | 428/407 X |
| 4,348,447 | 9/1982 | Miller, Jr. et al. | 428/325 X |
| 4,351,866 | 9/1982 | Mennesson et al. | 428/325 X |
| 4,356,037 | 10/1982 | Novak | 428/325 X |
| 4,420,513 | 12/1983 | Coke et al. | 428/323 X |

FOREIGN PATENT DOCUMENTS

| | | |
|---|---|---|
| 886375 | 1/1962 | United Kingdom . |
| 1107193 | 3/1968 | United Kingdom . |
| 1222655 | 2/1971 | United Kingdom . |
| 1413507 | 11/1975 | United Kingdom . |
| 1430794 | 4/1976 | United Kingdom . |

*Primary Examiner*—Henry F. Epstein

*Attorney, Agent, or Firm*—William R. Hinds

[57] ABSTRACT

Rounded quartz sand particles (22) are each enclosed in a hardenable resin skin (23) which is integrated with the skins on adjacent particles and which creates a binding of the particles to a primed base (20, 21). A significant fraction of the particles may be remote from the base and only integrated with adjacent particles so that a contoured or embossed effect is created to provide a supplementary non-slip feature. In a process for forming such a surface coating the particles are wetted with a functional liquid, mixed with a binder related to the functional liquid and sprayed. The spraying process is powered by a progressive cavity pump (37) with a selection of particle/resin ratio such that the pump operates under a Sigma effect.

6 Claims, 5 Drawing Figures

NON-SLIP SURFACE COATINGS

BACKGROUND OF THE INVENTION

This invention relates to non-slip surface coatings.

The invention is primarily concerned with non-slip floor coatings for use in heavy industrial situations and was conceived in the context of off-shore oil platforms but it also has application in other situations and to decorative and prefabricated wall panels and to other decorative surface coatings.

There is a large demand for non-slip coatings especially in situations where slip can be imposed by adverse conditions despite the exercise of maximum care and when slip can be particularly hazardous. The situations that come to mind are, for example, on the surfaces of off-shore oil platforms where high winds and slippery water and oil soaked surfaces are common; on stairways and elevated walk-ways; and on pitching surfaces such as may arise on ships.

There are also many known proposals for non-slip coatings. For example GB No. 1,430,794 describes non-slip surfaces made by spreading a polymer-mineral mixture and providing roughness by mechanical means. This is suitable for roadways but is unlikely to provide the high non-slip standards required on oil platforms. GB No. 1,413,507 describes particles of aggregate pre-coated with bitumen, heated, and compacted followed by covering with fine aggregate wear-coated or sealed in bitumen. The disadvantage of such coatings are referred to below with reference to FIG. 1A. GB No. 1,222,655 refers to a non-slip coating of epoxy resin having carborundum grit embedded therein. The disadvantages of this type of coating is referred to below with reference to FIG. 1B. GB No. 1,107,193 describes methods of producing surfaces having a distinctly rough feel involving spraying a liquid medium containing granular solid substances. The problem stated here is that the liquid medium sprays preferentially to the solid substances and blockages occur. GB No. 886,375 mentions a floor covering having an upper layer comprising filler and binder. Whilst reference is made to non-slip properties it is unlikely that it would remain non-slip in the presence of oil as it has a nominally level trowelled surface.

A common process for generating heavy duty non-slip coatings involves blasting a base surface to clean and remove any loose material; treating with a primer to generate adhesion and set up corrosion protection; applying a binder by brush, spray, trowel or roller; and finally applying a non-slip aggregate or particulate material, generally by hand while the binder is tacky. Subsequent repair by over coating is not recommended.

This is a four stage process involving some degree of manual skill. The surface, when inspected closely, shows particles of non-slip material held rather in the manner of acorns in cups, the particles being the acorns and the set or cured binder forming the cups. This is generally satisfactory. The non-slip material, with its irregular shape, is exposed and held to provide a non-slip surface.

However, the hold between the particles and the binder can be broken with harsh use and one way of reducing this risk is to provide a protective sealer or wear coat. However, unless used very uniformly, the sealer can tend to smooth the surface and acts against the required non-slip quality. Another deterioration which can arise in this known process, in the absence of a sealer or wearcoat, is fracture of the exposed aggregate which then tends to fill in the cavities between the aggregate and hence smooth the surface. Further, such a surface is difficult to clean and could not be accepted where there is a risk of spillages of toxic material which need to be cleaned up. Similarly, it cannot be readily cleaned of oil spillages. Thus, in many situations, the use of a sealer becomes essential and the consequent loss of non-slip quality must be accepted.

FEATURES AND ASPECTS OF THE INVENTION

The present invention aims to reduce the above stated disadvantages significantly and at the same time offer a process of applying a non-slip coating more conveniently and at a much accelerated rate. A relatively high ratio of filler to binder can be used so that costs are kept low. For most applications a low level of manual skill is required.

The invention resides in a process of making a product having a non-slip surface comprising the steps of:

(a) taking a non-slip particulate material and wetting and mixing it with a binder base to create a flowable composition which when applied as a film is hardenable with time, and (b) spraying the composition with a progressive cavity pump on to a prepared surface so that the particles of the non-slip material are caused to engage both with the prepared surface and with contiguous particles through the medium of a skin which hardens with time and which, on the surface of the product, closely follows the outline of the surface exposed particles of the non-slip material.

DESCRIPTION OF THE DRAWINGS

The invention will now be illustrated with reference to the accompanying drawings in which.

DESCRIPTION OF PREFERRED EMBODIMENTS

Figure 1:
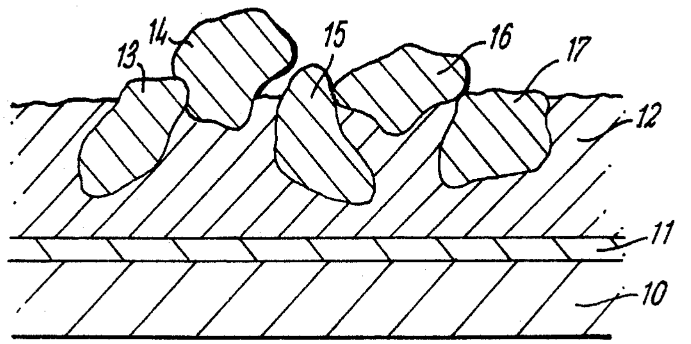
FIG. 1 PRIOR ART
FIG. 1 shows in section the structure of a known non-slip surface.

In FIG. 1 (which discloses prior art) a base 10, which has been blasted to clean it and remove any loose areas, is given a primer coat 11, which may have a sealing and anticorrosive character relative to the base and provide a key for other materials to be applied to the base.

The primer coat, when dry, is covered by brush, spray, trowel or roller with a varnish or other hardenable binder, layer 12. Non-slip particles 13 to 17, such as crushed granite, are then applied to the varnish whilst soft. The varnish hardens and holds the particles in place to give a non-slip surface. Particles 13, 15 and 17 are keyed securely but particles 14 and 16 have little more than face adhesion. With heavy use, particles 14 and 16 will become dislodged and the tips of the keyed particles 13, 15 and 17 will tend to fracture. This is illustrated in FIG. 1B. The particles 14 and 16 are missing and smaller particles 18 have become lodged in crevices and cavities. Thus a lot of the non-slip quality has been lost and the particles 18 tend to hold and bind with any substances dropped on the surface and provide a "dirty" surface.

Figure 1A:
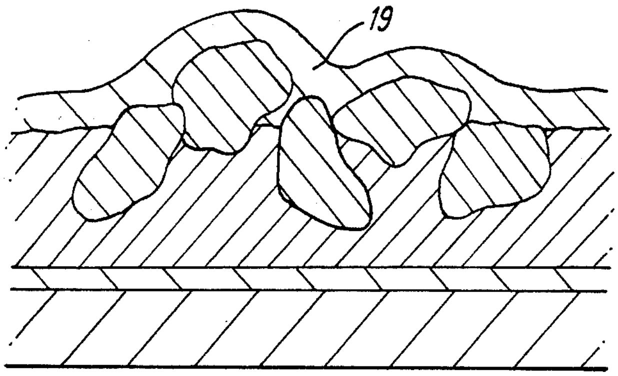
FIG. 1A PRIOR ART
FIG. 1A shows the structure of FIG. 1 treated with a sealer, where the sealer has been applied excessively.
Figure 1B:
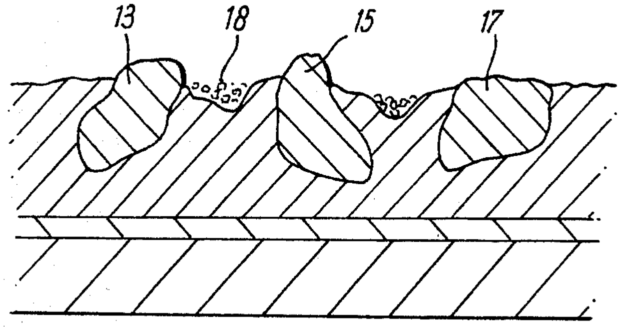
FIG. 1B PRIOR ART
FIG. 1B shows the structure of FIG. 1 which has not been treated with a sealer but has been subject to wear.

To avoid the situation as shown in FIG. 1B it is customary to provide a sealer coat 19 as shown in FIG. 1A. This has the merit of covering all the non-slip particles so that particles 14 and 16 are retained and avoids the creation of a dirty surface. It has the demerit of destroying a significant part of non-slip quality inherent in the non-slip particles as it flows and fills cavities and crevices, particularly where too much is applied, and it is a further process step which delays completion of the product.

Figure 2:
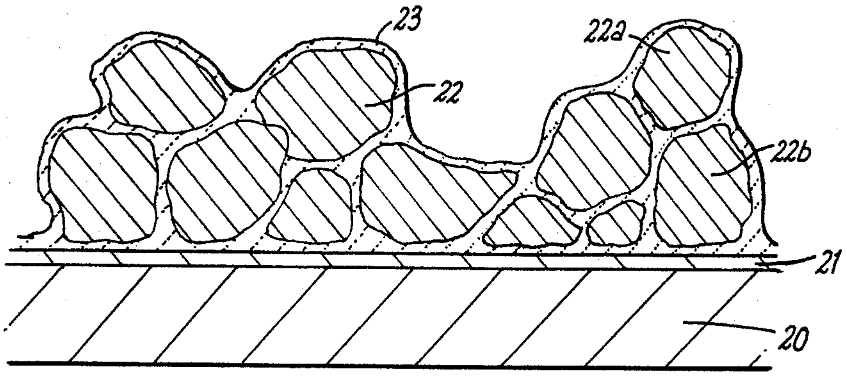
FIG. 2 shows, in section, the structure of a non-slip surface according to the invention.

In the arrangement of FIG. 2, a base 20 and primer 21 is shown with non-slip particles 22. These particles have a binder skin 23, which approximately follows (with only a sligh degree of rounding or smoothing) the profile of the surface exposed particles. The skin 23 binds particle to particle and binds some of the particles to base via the primer. In addition the particles 22 can stack one on the other (see, for example, particle 22*a* on particle 22*b*) and a further contour or emboss is added which aids the non-slip quality.

Whilst the skin 23 masks some of the roughness of the particles it does not mask to the same extent as would the application of a sealer (as in FIG. 1A) since there is no possibility of excess binder to "fill" the surface. Any masking that does arise (and hence any loss of non-slip quality) is made good by the further contouring that arises with the stacking of the particles.

It is seen that the skin 23 prevents loss of non-slip particles from the surface and prevents fragmentation of the particles. Thus a clear advantage is achieved relative to FIG. 1B. The advantage relative to FIG. 1A has been referred to.

A process and apparatus for manufacturing a product like that shown in FIG. 2 is now described with reference to FIG. 3.

Figure 3:
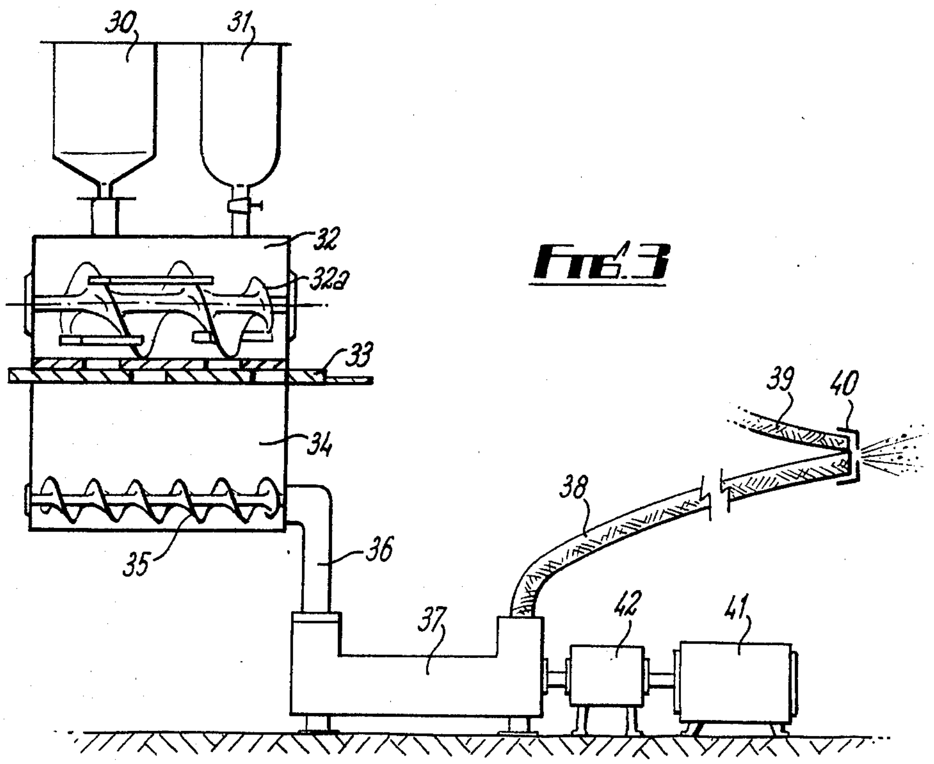
FIG. 3 shows, diagrammatically, an apparatus suitable for manufacturing the surface shown in FIG. 2.

The apparatus of FIG. 3 comprises a particulate material hopper 30 and a resin reservoir 31. The hopper and reservoir feed to a mixing chamber 32 having a rotary blade mixer 32*a*. The base of the chamber 32 has a slide gate 33 to allow the mixed contents of chamber 32 to fall into a feed chamber 34 which has, in its lower regions, a screw feeder 35.

The feeder 35 feeds mixed material to a progressive cavity pump 37 (sometimes referred to as a "MONO" pump) via a conduit 36. The pump 37 discharges to a pressurised line 38. The line 38 has an associated air line 39 and nozzle 40 so that non-slip product fed along line 38 can be sprayed on to a prepared surface, such as base 20 and primer 21 of FIG. 2. The product fed is representative of the mixed feed in chamber 34. There is no preferential separation of the constituents.

The pump 37 is driven by a motor 41 through a variable gear box 42.

The apparatus of FIG. 3 is very similar to known apparatus for spraying plaster to general relief surfaces but is modified to have a stainless-steel rotor and solvent resistant synthetic rubber stator.

A typical process in accordance with the invention is as follows: coarse pigmented rounded quartz sand (of two differing pigmentations) is wetted with a liquid epoxy or urethane catalyst and supplied to the hopper 30. A urethane or epoxy binder is supplied to the reservoir 31. Measured amounts of wetted sand and binder are supplied to the mixing chamber 32 and the mixer 32*a* started to provide a flowable composition of sand and catalysed binder adhering to the sand. When mixing is complete the gate 33 is opened and the composition passes to the feeder 35, pump 37 and then to spray nozzle 40.

The complete process involving blasting, priming and spraying may typically take two days instead of the more customery three or four days in which time a very large area can be treated and low manual skill only is required.

The particles preferably lie predominantly in the range of 0.2 mm to 3.0 mm and especially in the range 0.3 mm to 2.0 mm.

A specific formulation (parts by weight) for carrying out the invention will now be described:

| | |
|---|---|
| DESMOPHEN 800* (85% solids) | 175 |
| DESMOPHEN 1700* (70% solids) | 75 |
| China Clay | 100 |
| 10% BENTONE 38 (thickening agent by N.L. Industries Inc., New Jersey) | 25 |
| Rounded Sand in the range 0.3–2.0 mm | 900 |
| Xylene | 40 |
| DESMODUR N* (75% solids) | 396 |

*Polyurethane resin and polyester curing agent dissolved in ethyl glycol acetate, supplied by Bayer, Germany.

The invention has application to providing non-slip surfaces on steel, concrete, wood, stone, etc. and on firm painted surfaces. It may also be used on wall areas, particularly for exteriors.

Thick coatings can be applied and repair overcoatings are practical. Various grades, colours, sizes and types of aggregates can be applied separately or together to give decorative effects.

The invention relies on the unexpected discovery that the pump 37 can handle such abrasive material as rounded quartz sand in resin at high operating loading without excessive wear on the pump. In investigating this phenomena it is believed that the invention exploits the known Sigma or wall effect. This effect shows that, if a mixture of solids and liquids is compressed in a tube, then the solids tend to move away from the wall of the tube. In the invention the moving cavity in the pump between stator and rotor can be considered as a highly distorted tube but nevertheless such that the mixture of sand and resin is subjected to the Sigma or wall effect and the resin goes to the surfaces of rotor and stator and there provides a protective lubricating surface. This effect is aided by having rounded, nodular, spheroidal and/or ovoid particles present which are relatively large compared to clearances through which the composition is passing.

Products according to the invention typically have a filler (particle) to binder (resin) ratio by volume of better than 2:1 and preferably nearer 4:1.

A second formulation is given as follows (all parts given by weight).

| | |
|---|---|
| EPIKOTE 1001 (epoxy resin by Shell Chemicals Limited) | 8.56 |
| Rounded Quartz (1–2 mm) | 58.79 |
| BENTONE 38 | 0.65 |
| Talc | 9.79 |
| Cellosolve Acetate | 5.34 |
| Xylene | 5.34 |
| SOLVESSO 100 (aromatic solvent by Esso Chemicals Limited) | 6.97 |

-continued

| | |
|---|---|
| VERSAMID 115 (curing polyamide) | 4.28 |

The talc acts as a fine extender.

The EPIKOTE is dissolved in the three solvents and the talc and BENTONE are then dispersed in the solution. The quartz is then stirred in. When required for use the curing polyamide VERSAMID is added.

We claim:

1. A process for making a product having a non-slip surface comprising the steps of:

(a) taking a non-slip particulate material in the form of particles of rounded shape and wetting and mixing it with a binder to create a flowable composition which is hardenable with time when applied as a film; and (b) spraying the composition with a progressive cavity pump on to a base so that the particles of the non-slip materials are caused to engage both with the base and with contiguous particles through the medium of a skin which hardens with time and which, on the surface of the product, closely follows the outline of the surface exposed particles of the non-slip material.

2. A process according to claim 1 in which the particles are of rounded quartz sand in the grade range of 0.3 mm to 2.0 mm.

3. A process according to claim 1 in which a fraction of the particles engage only with adjacent particles and not with the base so that a contour or emboss is set up.

4. A process according to claim 1 in which the particulate material is of two or more visually differing materials and the skin is transparent so that a decorative non-slip surface is obtained.

5. A non-slip product made by the process of claim 1 and comprising a base (20, 21) having thereon non-slip particulate material of rounded shape, the particles (22) thereof being enclosed by a skin (23) which is integrated with the skins on adjacent particles and which has created a binding of the particles with the base, and the particles being stacked to add a contour which is in excess of that inherent from particle profiles.

6. A textured decorative product made by the process of claim 1 and comprising a wall having thereon rounded abrasive particulate material, the particles (22) thereof being enclosed by a skin (23) which is integrated with the skins on adjacent particles and which has created a binding of the particles with the wall, and the particles being stacked to add a contour which is in excess of that inherent from particle profiles.

* * * * *